US011455287B1

(12) United States Patent
Hillion et al.

(10) Patent No.: US 11,455,287 B1
(45) Date of Patent: Sep. 27, 2022

(54) SYSTEMS AND METHODS FOR ANALYSIS OF DATA AT DISPARATE DATA SOURCES

(71) Applicant: TIBCO Software Inc., Palo Alto, CA (US)

(72) Inventors: Steven Hillion, San Mateo, CA (US); Yi-Ling Chen, Austin, TX (US); Zhe Dong, San Mateo, CA (US); Yong-Sheng Yu, San Mateo, CA (US); Yong Zhao, San Mateo, CA (US)

(73) Assignee: TIBCO Software Inc., Palo Alto, CA (US)

( * ) Notice: Subject to any disclaimer, the term of this patent is extended or adjusted under 35 U.S.C. 154(b) by 404 days.

(21) Appl. No.: 13/957,280

(22) Filed: Aug. 1, 2013

Related U.S. Application Data (60) Provisional application No. 61/678,467, filed on Aug. 1, 2012.

(51) Int. Cl.
| | |
|---|---|
| *G06F 16/22* | (2019.01) |
| *G06F 16/2452* | (2019.01) |
| *G06F 16/835* | (2019.01) |
| *G06F 16/242* | (2019.01) |
| G06F 16/2458 | (2019.01) |
| G06F 16/832 | (2019.01) |
| G06F 16/25 | (2019.01) |

(52) U.S. Cl.
CPC .......... *G06F 16/22* (2019.01); *G06F 16/2428* (2019.01); *G06F 16/24524* (2019.01); *G06F 16/8358* (2019.01); *G06F 16/2471* (2019.01); *G06F 16/25* (2019.01); *G06F 16/832* (2019.01)

(58) Field of Classification Search
CPC .... G06F 17/30442; G06F 16/25; G06F 16/22; G06F 16/2428; G06F 16/24524; G06F 16/8358; G06F 16/832; G06F 16/2471
See application file for complete search history.

(56) References Cited

U.S. PATENT DOCUMENTS

| | | | | |
|---|---|---|---|---|
| 7,917,463 | B2 * | 3/2011 | Dagum ................. | G06F 16/182 707/600 |
| 8,010,905 | B2 * | 8/2011 | Ryan ...................... | G06F 16/20 715/765 |
| 9,978,024 | B2 * | 5/2018 | Ryan ...................... | G06Q 10/06 |
| 10,713,608 | B2 * | 7/2020 | Goja ....................... | G06Q 10/06 |
| 2003/0169284 | A1 * | 9/2003 | Dertinger ............ | G06F 16/2428 715/708 |

(Continued)

OTHER PUBLICATIONS

Abouzeid et al., "HadoopDB: An architectural Hybrid of MapReduce and DBMS Technologies for Analytical Workloads", VLDB '09.*

(Continued)

*Primary Examiner* — Brittany N Allen
(74) *Attorney, Agent, or Firm* — McGuireWoods LLP (57) ABSTRACT

Embodiments are described for a system and method to analyze data at a plurality of data sources. A data analytic workflow may be received. The data analytic workflow may include at least one operation to be performed on a plurality of data sets stored at a plurality of data sources. Instructions may be created based on the operation to be performed and a type of platform that operates the data sources. Furthermore, the instructions may be transmitted to the data sources such that the data sources may execute the operations on the data sets stored at the data sources.

22 Claims, 6 Drawing Sheets

(56) References Cited

U.S. PATENT DOCUMENTS

| | | | |
|---|---|---|---|
| 2005/0004911 A1* | 1/2005 | Goldberg | G06F 16/2428 |
| 2005/0010557 A1* | 1/2005 | Dertinger | G06F 16/2428 |
| 2005/0060647 A1* | 3/2005 | Doan | G06F 17/30554 |
| | | | 715/205 |
| 2006/0074735 A1* | 4/2006 | Shukla | G06F 8/34 |
| | | | 705/80 |
| 2006/0129443 A1* | 6/2006 | Chen | G06Q 10/10 |
| | | | 715/771 |
| 2007/0208723 A1* | 9/2007 | Peterson | G06F 16/256 |
| 2007/0219959 A1* | 9/2007 | Kanemasa | G06F 17/30545 |
| 2011/0302151 A1* | 12/2011 | Abadi et al. | 707/714 |
| 2013/0073538 A1* | 3/2013 | Beerbower | G06F 17/30545 |
| | | | 707/718 |
| 2013/0212234 A1* | 8/2013 | Bartlett | G06Q 10/0633 |
| | | | 709/220 |
| 2013/0262425 A1* | 10/2013 | Shamlin | G06F 17/30566 |
| | | | 707/703 |
| 2014/0032606 A1* | 1/2014 | Chandler | G06F 8/34 |
| | | | 707/798 |
| 2014/0101092 A1* | 4/2014 | Simitsis | G06F 9/451 |
| | | | 707/602 |
| 2016/0350079 A1* | 12/2016 | Louie | G06F 3/04847 |
| 2017/0103103 A1* | 4/2017 | Nixon | G06F 16/2452 |

OTHER PUBLICATIONS

Kelly, Jeffrey, Alpine Data Labs Offers Visualization Tools to Create In-Database Analytics Models, SiliconANGLE, May 23, 2011.*

TIBCO's Master Data Management Solution Consistent Information Everywhere, retrieved from Wayback Machine on Jan. 1, 2011 (Year: 2011).* formvine.com, retrieved from Wayback Machine on Dec. 21, 2011 (Year: 2011).*

TIBCO Formvine, retrieved from Wayback Machine on Aug. 2, 2012 (Year: 2012).*

TIBCO Business Studio, Process Modeling User's Guide, Mar. 2012 (Year: 2012).*

\* cited by examiner

SYSTEMS AND METHODS FOR ANALYSIS OF DATA AT DISPARATE DATA SOURCES

CROSS-REFERENCE TO RELATED APPLICATIONS

The present application claims the benefit of the U.S. Provisional Application No. 61/678,467 entitled "Analytics Platform for Diverse Data," filed on Aug. 1, 2012, the entire contents of which is incorporated herein.

FIELD OF THE INVENTION

The present disclosure generally relates to data analysis. In some embodiments, the present disclosure relates to an analysis of data at disparate data sources.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Business organizations typically generate, store, and analyze large amounts of data as part of their normal business activities. Organizations that process large amounts of data typically rely on large storage resources and integrate various data sources into data warehouses through data warehousing techniques that centralize data management and retrieval tasks to maintain a central repository of all organizational data. Although such centralization of data is helpful in maximizing data access and analysis, in many organizations data resides in different locations and may be managed by different data source platforms. Furthermore, organizations are increasingly using data analysis techniques with their own data sources and other external data sources managed by other organizations.

The process of data analysis for such organizations involves analyzing data from different data sources and summarizing the data into useful information. As a functional process, data analysis involves finding correlations or patterns among numerous data sets in various and disparate data sources. These patterns themselves may include useful information about the data, and various data analysis programs have been developed to allow users to analyze and categorize data and summarize the relationships among the data sets from the various data sources.

In order to analyze various data sets from disparate data sources, present data analysis systems typically combine and store the data from the disparate data sources and analysis of the data may be performed after the data has been retrieved from the disparate data sources and combined in local memory of the data analysis system. However, the data sets being analyzed are becoming increasingly complex and large. As such, retrieving or moving the data sets from the disparate data sources to a local memory of a conventional data analysis system may be inefficient as the retrieval of the data and computation of such large data sets may result in increased data analysis time.

As such, what is needed is a system and method for analyzing data at the disparate data sources by having the data sources execute the steps associated with the analysis. For example, an analytic workflow of data at multiple types of data sources may be performed by transmitting instructions for executing operations on data to each of the data sources based on the type of data source such that the operating platform of the data sources may analyze the data. Thus, data movement (e.g., retrieving and storing the data between data sources or the local memory of the data analysis system) is reduced and overall computational speed of the data analysis is improved.

BRIEF DESCRIPTION OF THE DRAWINGS

In the following drawings, like reference numbers are used to refer to like elements. Although the following figures depict various examples, the one or more implementations are not limited to the examples depicted in the figures.

DETAILED DESCRIPTION

Systems and methods are described for a data analysis system. Aspects of the one or more embodiments described herein may be implemented on one or more computers executing software instructions. The computers may be networked in a client-server arrangement or similar distributed computer network, and one or more of the networked computers may host web pages that are accessed by one or more client computers through web browser programs.

Any of the embodiments described herein may be used alone or together with one another in any combination. The one or more implementations encompassed within this disclosure may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the disclosure, the embodiments do not necessarily address any of these deficiencies. In other words, different embodiments may address different deficiencies that may be discussed in the disclosure. Some embodiments may only partially address some deficiencies or just one deficiency that may be discussed in the disclosure and some embodiments may not address any of these deficiencies.

In some embodiments, the present disclosure is directed to a visual objected-oriented data analysis tool to analyze data at one or more data sources. The data analyzer provides a fully integrated environment to provide statistical transformation and modeling methods for data analysis and modeling. The data analyzer described herein circumvents the conventional practice of tightly coupling in-database analytic workflow programs to the source data source used for designing the analytic workflow. The present disclosure enables the in-database analytic workflow and is configured to be agnostic with respect to the platform type of data sources used in the analytic workflow.

As used herein, "data" may refer to any facts, numbers, or text that can be processed by a computer. Data may include operational or transactional data (e.g., sales, cost, inventory, payroll, and accounting), nonoperational data (e.g., industry sales, forecast data, and macro economic data), and metadata, which is data about the data itself (e.g., attributes, data types, and definitions). In some embodiments, data may also be referred to as data sets or data sets. The terms "component," "process," and "module" are used interchangeably to refer to a logical component that is configured to perform certain functionality as described herein, and which may be implemented at least partially as an electronic hardware component, and therefore constitutes a machine, or may be implemented in software, hardware, or a combination of software and hardware for execution or implementation in a processor-based computing system.

Figure 1:
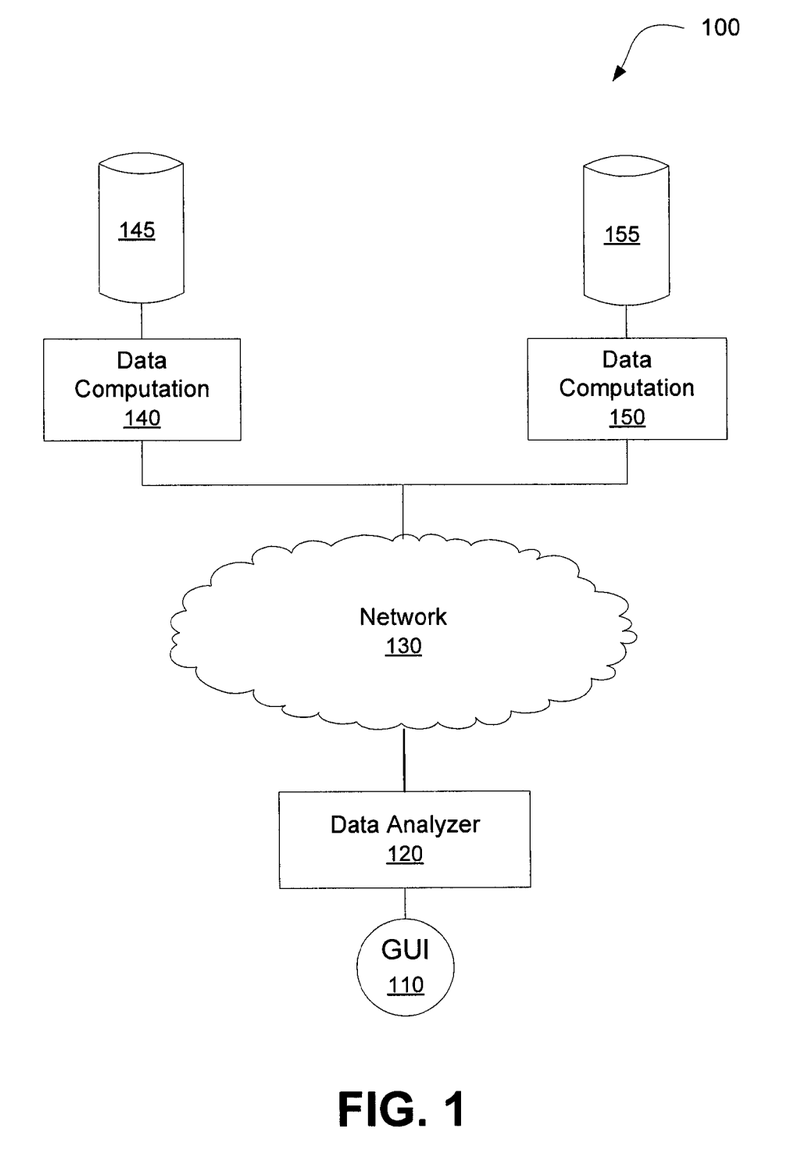
FIG. 1 is a diagram of an example environment for analyzing data at disparate data sources in accordance with some embodiments.

FIG. 1 is a diagram of an environment 100 for analyzing data at disparate data sources. In general, the environment 100 may include a local computing system (e.g., the data analyzer 120) to receive a user input and remote computing systems associated with data sources (e.g., data computation 140 associated with data source 145 and/or data computation 150 associated with data source 155) to execute operations of the user input.

As shown in FIG. 1, the environment 100 may include a data analyzer 120 and a graphical user interface (GUI) 110. In some embodiments, the data analyzer 120 may receive an input from the graphical user interface 110. For example, the graphical user interface 110 may include a drag and drop functionality so that a user may specify a data analytic workflow by dragging and dropping icons or blocks representing data sets stored at data sources and operations to be performed on the data sets stored at the data sources. Further details with regard to the graphical user interface 110 and the creation of the data analytic workflow are disclosed with relation to FIGS. 4 and 5.

In some embodiments, the data analyzer 120 may operate in conjunction with remote data sources. For example, the data analyzer 120 may transmit and receive data to and from data source 145 and data source 155 through the network 130. In some embodiments, the network 130 may be the Internet, a Wide Area Network (WAN), a Local Area Network (LAN), or any combination thereof. Furthermore, each of the data sources 145 and 155 represent storage of data or data sets in one or more physical memory components such as optical or magnetic disk storage, tape storage, Redundant Array of Independent Disks (RAID) arrays, flash memory, or any other type of memory storage media. Each of the data sources 145 and 155 may be associated with a data computation component. For example, the data source 145 may be associated with the data computation 140 and the data source 155 may be associated with data computation 150. The data computation 140 and 150 may perform data analysis of data stored on the associated data source 145 or 155. For example, the data computation 140 may perform data management or analysis functions based on a data source platform upon which the data source 145 is operated or run and the data computation 150 may perform data management or analysis functions based on a data source platform upon which the data source 155 is operated or run.

In some embodiments, the data source platforms may include, but are not limited to, Oracle™, Greenplum™, PostgreSQL, or Hadoop. As such, the data source 145 may be operated based on a first data source platform and the data source 155 may be operated based on a different second data source platform. In some embodiments, the data computation (e.g., data computation 140 or 150) and data source (e.g., data source 145 or 155) may be or associated with the same server, component, system, or computer.

The data analyzer 120 may be configured to receive a data analytic workflow and to transmit instructions associated with the data analytic workflow to the data computation components 140 and 150. For example, the data analytic workflow may specify a sequence of computations associated with operations (e.g., instructions) to be performed on data sets stored at the data sources 145 and 155. As such, the data analyzer 120 may be considered to locally receive a data analytic workflow and to transmit instructions over a network to remote data sources or data computation components so that the data sources may perform or execute the instructions that have been transmitted over the network 130.

In some embodiments, the environment 100 of FIG. 1 represents an enterprise data cloud solution environment for large-scale data warehousing and analytics using enterprise storage arrays, storage area networks, and archive resources for use by content management systems. Furthermore, in some embodiments, the environment 100 may be used by business analysts and data analysts to flexibly and efficiently conduct end-to-end knowledge discovery and predictive analytics processes against data sets stored at one or more remote data sources.

Figure 2:
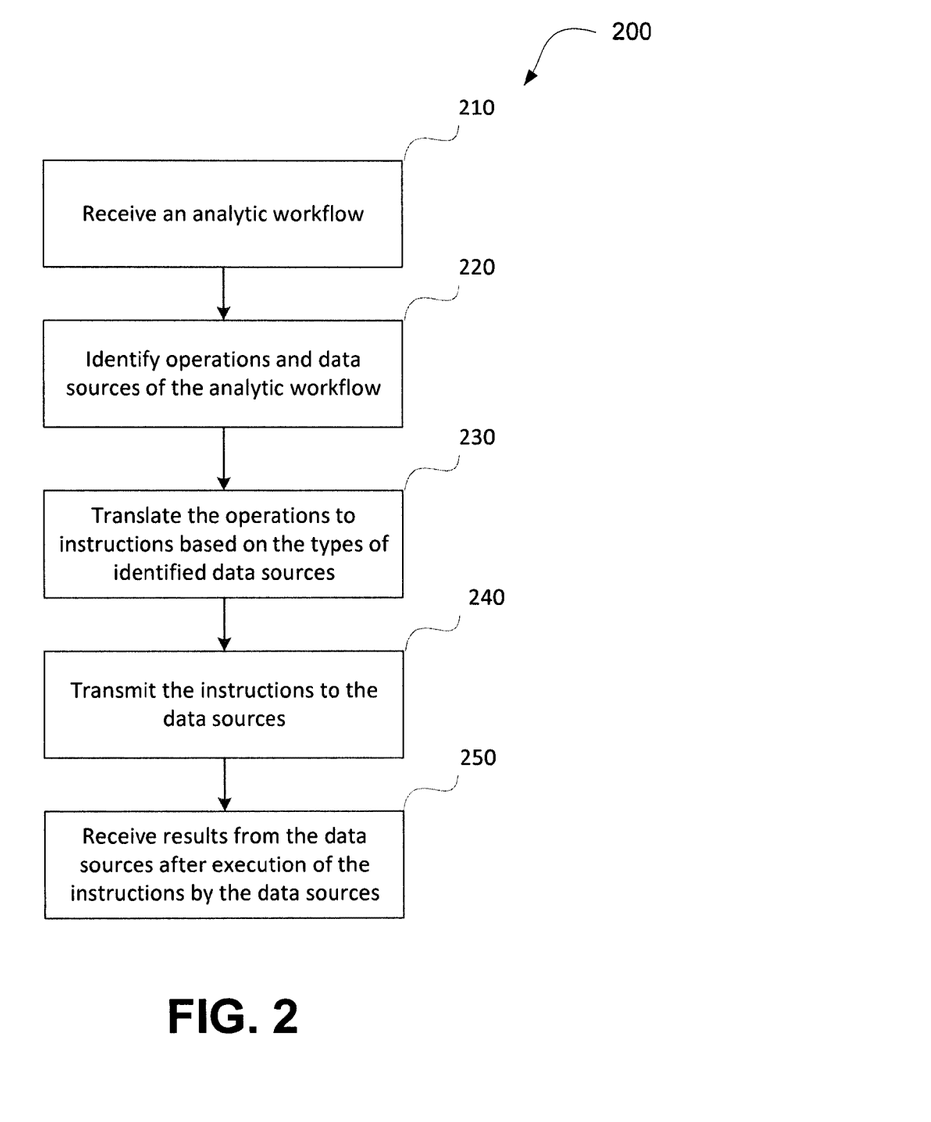
FIG. 2 illustrates an example method to transmit instructions associated with a data analytic workflow.

FIG. 2 illustrates an example method 200 to transmit instructions associated with a data analytic workflow. In general, a data analyzer (e.g., data analyzer 120) may receive a data analytic workflow (e.g., as defined by GUI 110) and transmit instructions to be executed by one or more data sources associated with the data analytic workflow (e.g., data computation 140 associated with data source 145 and/or data computation 150 associated with data source 155).

As shown in FIG. 2, the method 200 may receive, at step 210, a data analytic workflow. For example, a user defined data analytic workflow may be received from a graphical user interface. In some embodiments, the data analytic workflow may include one or more data operations to be performed on one or more data sets located at one or more data sources. For example, the data analytic workflow may include mathematical or logical operations to be performed on data sets located and stored at different data sources. At step 220, the operations (e.g., mathematical and/or logical operations) and the data sources of the data analytic workflow may be identified.

In some embodiments, the data analytic workflow may include a plurality of operations and a plurality of data sources. For example, an operation to be performed on a first data set at a first data source and a second data set at a second data source may be identified. At step 230, the operations of the analytic workflow may be translated to instructions based on the platform type of the data sources that have been identified. For example, the first data source may include a database that is managed or operated by a relational database management system (RDBMS) or platform such as Structured Query Language (SQL) and the second data source may be a data source that is managed or operated by a distributed file system or platform (e.g., Hadoop). As such, the method 200 may identify that a first operation is to be performed by the first data source associated with the RDBMS platform as well as by the second data source associated with the Hadoop platform. Thus, the method 300 may translate the operations of the data analytic workflow into instructions for the RDBMS platform as well as instructions for the Hadoop platform.

In some embodiments, the instructions may include programming code, function calls, directions, or other functionality to be executed at the data source to complete the operation of the data analytic workflow. For example, the method 300 may translate the one or more operations identified in the data analytic workflow into a series of steps or a sequence of computations to be executed on the data set by a platform, operating system, or data computation component associated with the data source (e.g., the RDBMS platform and/or the Hadoop platform).

As such, in some embodiments, the data analytic workflow may include operations to be performed on a first data set at a first data source and a second data set at a second data source. A first operation may be specified to be performed on the first data set, a second operation may be specified to be performed on the second data set, and a third operation may be specified to be performed on both the first data set and the second data set after the performance, execution, or completion of the first and second operations. In some embodiments, a first set of instructions may be transmitted over a network to the first data source and a second set of instructions may be transmitted over the network to the second data source. Each set of instructions may be based on a type of system or platform that manages or operates the respective data sources and the operations that have been specified for the data sets at the respective data sources. The instructions may include programming code, command lines, function calls, sequences of computations, or other platform specific information associated with a data source that may be executed in order to complete an operation. For example, the first set of instructions may include RDBMS programming code to be executed by the first data source to perform the first operation and the third operation on the first data set and the second set of instructions may include Hadoop function calls to be executed by the second data source to perform the second operation and the third operation on the second data set.

Returning to FIG. 2, at step 240, the instructions may be transmitted to the data sources. For example, the instructions based on the RDBMS platform may be transmitted to the first data source running the RDBMS platform and the instructions based on the Hadoop platform may be transmitted to the second data source running the Hadoop platform. Next, at step 250, results may be received from the data sources after the transmitted instructions have been executed by the data sources to perform the necessary operations on the data sets. For example, the data sources or a computational component associated with the data sources may execute the instructions on the data sets stored at the data sources.

As such, a data analytic workflow may be locally received (e.g., by a first computer) and operations of the data analytic workflow may be remotely executed or remotely performed at remote data sources and/or by data computation components of the data sources (e.g., by a second and third computer) included in the data analytic workflow. In some embodiments, the data analytic workflow may include at least one operation to be performed on one or more data sets located at one or more data sources. The data sources may be associated with different operating platforms. The operations specified in the data analytic workflow may be translated to instructions based on the platform type of the data source that stores the data set that is subject to the operation. The instructions may be executed by a computer, system, or data computation component of the data sources to perform the steps necessary to complete the operation. The data analysis may be performed at and by the data sources themselves as opposed to a central repository (e.g., data analyzer 120). As such, the execution of the instructions (and thus performance of the operations) are performed remotely by the data sources that store the data sets.

Figure 3:
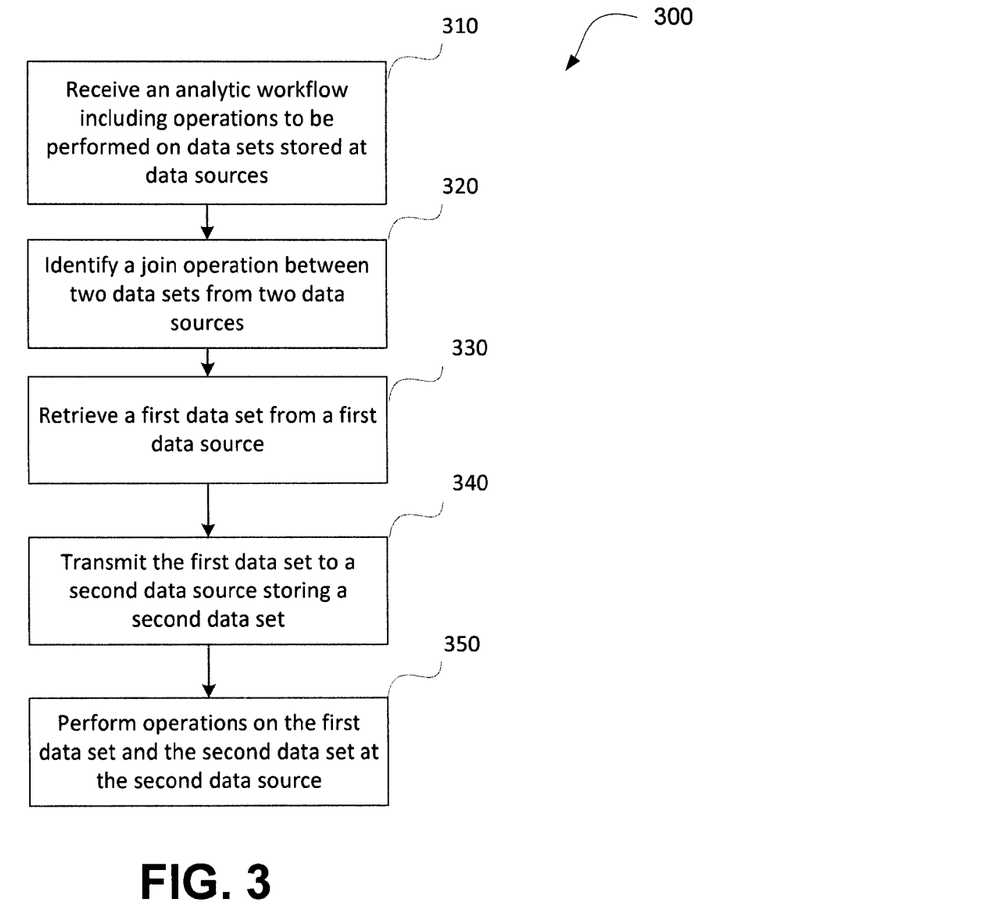
FIG. 3 illustrates an example method to perform operations associated with a plurality of data sets from a plurality of data sources at one of the data sources in accordance with some embodiments.

FIG. 3 illustrates an example method 300 to perform operations associated with a plurality of data sets from a plurality of data sources at one of the data sources. In general, a data analyzer (e.g., data analyzer 120) may receive a data analytic workflow (e.g., as defined by a GUI 110) including an operation between a plurality of data sets at a plurality of data sources (e.g., data sources 145 and/or 155) and transmit a data set to one of the data sources to complete an operation included in the data analytic workflow.

As shown in FIG. 3, the method 300 may receive, at step 310, a data analytic workflow that includes operations to be performed on a plurality of data sets stored at a plurality of data sources. Furthermore, at step 320, a join operation may be identified in the data analytic workflow. For example, the data analytic workflow may include a join operation between a first data set at a first data source and a second data set at a second data source. In some embodiments, such a join operation may specify the combining of the first data set with the second data set. Thus, a join operation to combine the first data set stored at the first data source with the second data set stored at the second data source may be identified in the data analytic workflow. Furthermore, in some embodiments, additional operations may be specified for the joined data sets (e.g., the combined first data set and the second data set). For example, after the first data set has been combined with the second data set, a subsequent operation may be performed on the joined data set (e.g., the combined first data set and the second data set).

Returning to FIG. 3, at step 330, the first data set may be retrieved from the first data source and, at step 340; the retrieved first data set may then be transmitted to the second data source. In some embodiments, the data analyzer may retrieve the first data set by querying the first data source for the first data set and may subsequently transmit the first data set to the second data source. As such, the first data set specified in the join operation in the data analytics workflow may now be stored with the second data set at the second data source. In some embodiments, the first data set may be combined with the second data set. Next, at step 350, operations may now be performed on the combined first data set and second data set at the second data source. For example, further mathematical or logical operations may be performed by a computer or data computation component of the second data source on the combined data sets.

As such, a join operation may be performed on a first data set and a second data set to create a combined data set including the first data set and the second data set. A second operation may subsequently be specified for the combined data set. In response to the join operation, the first data source may be queried and the first data set stored at the first data source may be retrieved (e.g., by the data analyzer 120). The first data set may then be transmitted to the second data source that stores the second data set. In some embodiments, the first data set may then be stored at the second data source. The first data set and the second data set may then be joined (i.e., combined) at the second data source. Instructions to perform the second operation for the combined data set at second data source may be translated and transmitted to the second data source. The second data source may then execute the instructions to perform the sequence of computations associated with the second operation on the combined data set.

Figure 4:
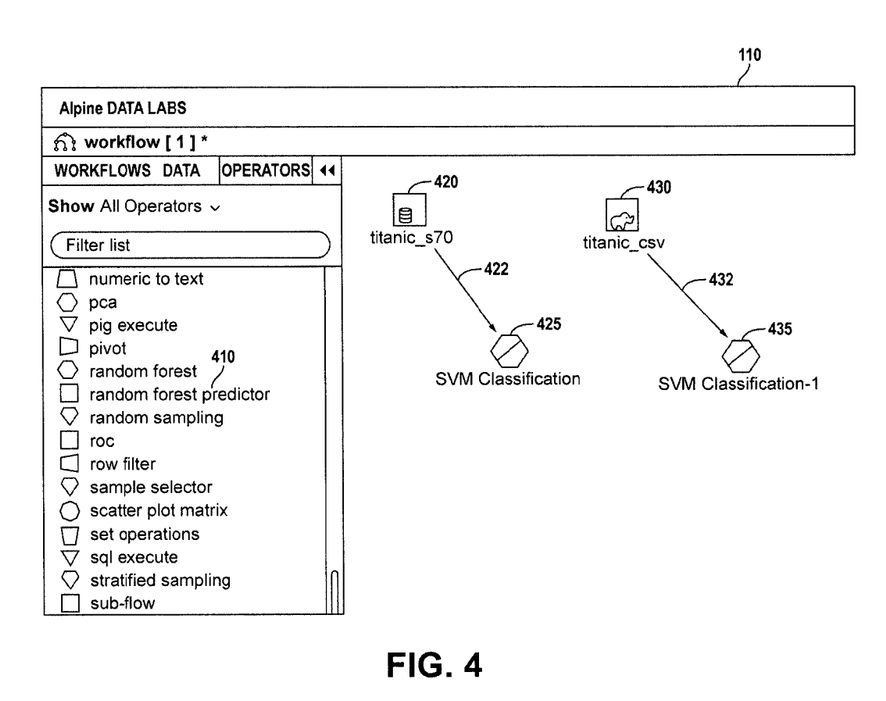
FIG. 4 illustrates a graphical user interface with a drag and drop functionality to create a data analytic workflow in accordance with some embodiments.

FIG. 4 illustrates an example graphical user interface 110 with a drag and drop functionality to create a data analytic workflow. In general, the graphical user interface 110 may be used to specify data sets stored at remote data sources (e.g., data sources 145 and/or 155) and operations on the data sets in a data analytic workflow and used by a data analyzer (e.g., data analyzer 120) to create instructions associated with the data analytic workflow.

As shown in FIG. 4, the graphical user interface 110 may include an operators panel 410. In some embodiments, the operators panel 410 may identify the available mathematical or logical operations that may be used in a data analytic workflow. A user of the graphical user interface 110 may select an operator from the operators panel 410 and drag and drop the operator in the workspace area of the graphical user interface 110. Furthermore, in some embodiments, the operators panel 410 may be replaced by a data panel so that a user of the graphical user interface 110 may select a data set from a data source from the data sources panel and drag and drop a data set from a data source into the workspace area of the graphical user interface 110. In some embodiments, a data set from a data source or an operation that has been dropped into the workspace of the graphical user interface 110 may be represented as a block or an icon.

As shown in FIG. 4, the data icons 420 and 430 may each represent a different data set from a data source. For example, the data icon 420 may represent a data set stored at a database data source (e.g., SQL platform) and the data icon 430 may represent a data set stored at a distributed file system data source (e.g., Hadoop platform). Furthermore, the operation icons 425 and 435 may each represent the same or different operations. For example, each of the operation icons 425 and 435 may represent a support vector machine (SVM) classification operation or each of the operation icons may represent different operations.

In some embodiments, the graphical user interface 110 may further be used to specify or create links between data icons and operation icons. Such links may specify that the function of the operation icon is to be performed on the linked data set from the data source of the data icon. For example, as shown, the link 422 may connect the data icon 420 with the operation icon 425 such that the function from the operation icon 425 may be performed on the data set from a data source associated with the data icon 420. Similarly, the link 432 may connect the data icon 430 with the operation icon 435 such that the function from the operation icon 435 may be performed on the data set from a data source associated with the data icon 430.

Figure 5:
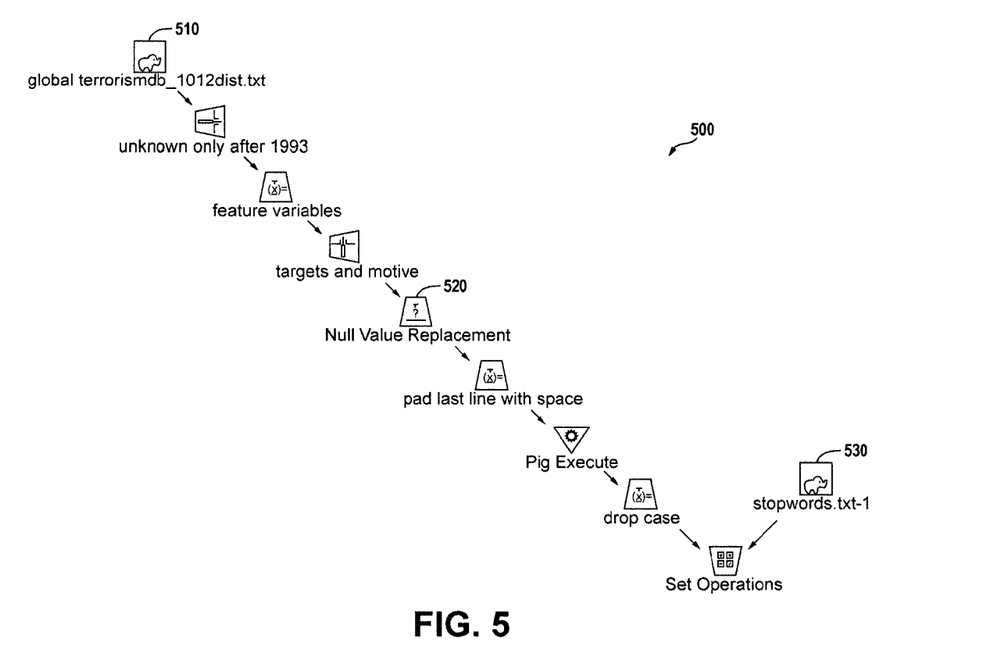
FIG. 5 illustrates an example data analytic workflow that may be created with the graphical user interface of some embodiments.

FIG. 5 illustrates an example data analytic workflow 500 that may be created with the graphical user interface (e.g., GUI 110). As shown, the data analytic workflow 500 may include a plurality of data sets and a plurality of operations. For example, the data analytic workflow 500 may include a data set 510 and a data set 530. In some embodiments, the data set 510 and the data set 530 may be from either the same data source (e.g., the same data source run on a Hadoop platform) or from different data sources. Furthermore, the data analytic workflow may include a plurality of operations 520 to perform a sequence of operations on at least one of the data sets. As shown, the operations 520 includes a series or sequence of operations to be performed on the data set 510.

As such, a drag and drop functionality of a graphical user interface may be used to create a data analytic workflow by specifying data sets stored at data sources and operations to be performed on at least one of the data sets. Examples of data sources include, but are not limited to, databases and Hadoop distributed file systems. The operations of the data analytic workflow may be any type of mathematical or logical operation or function. Examples of such operations include, but are not limited to, data extraction operators, exploration operators, modeling algorithm operators, model validation operators, prediction operators, sampling operators, transformation operators, and analysis operators. Data extraction operators may specify how to connect to a particular data source (e.g., a database table operator or a Hadoop file operator) and an operation to copy a first data set at a first data source of a first data type to a second data source of a second data type.

For example, the data extraction operator may specify to copy a data set of an RDBMS data source to a second data source that is a cluster of a distributed file system (e.g., Hadoop). Exploration operators may visualize a data set and specify or define how to display the data. Modeling algorithm operators may define a modeling method or mathematical calculations to apply to an input data set. Examples of such modeling algorithm operators include, but are not limited to, AdaBoost, Association, Cart Tree, Decision Tree, K-Means, Linear Regression, Logistic Regression, Neve Bayes, Neural Network, Principal Component Analysis, SVM Classification, SVM Novelty Detection, SVM Regression, SVD, and Time Series operators. The model validation operators may provide an assessment of a model's validity. Examples of the model validation operator include, but are not limited to, Goodness of Fit, LIFT and ROC operations. The prediction operations may be used to apply a particular modeling algorithm operator to a new data set for prediction purposes. The sampling operators may provide a sample of a source data set.

Examples of sampling operators include, but are not limited to, Random Sampling, Stratified Sampling, and Sample Selector operators. Transformation operators may define data set transformations. Examples of transformation operators include, but are not limited to Aggregate, Normalization, Null Value Replacement, NumericToText, Pivot, Row Filter, Column Filter, Table Join, Variable, WeightOfEvidence, and WOE Table Generator operations. The tool operator may perform various functions useful for extending the capabilities of workflows, such as Notes, Sub-Flows, Pig and SQL Execute, and Model Control.

As such, any number of operators may be included in a data analytic workflow. The operators may be used to apply data analysis algorithms. Each operator may perform a certain function or task with respect to the data sets to which it is applied. Although various types of operators have been disclosed, one skilled in the art would recognize that disclosed operators and functions are provided primarily for purposes of illustration, and that any other categories, operators, and functions may be used in conjunction with the present disclosure.

In some embodiments, the data analytic workflow may be considered a flow of operators. Each operator may receive input from one or more preceding operators, performs its task or function, and produces output through one or more succeeding operators. Operators may be associated with parameters that may be configured by the user (e.g., through the GUI 110) and may produce visual output. As such, an input from a first operator is received by a second operator and the output produced by the second operator is then passed to its succeeding operator after applying the applicable parameters and functions of the second operator.

Figure 6:
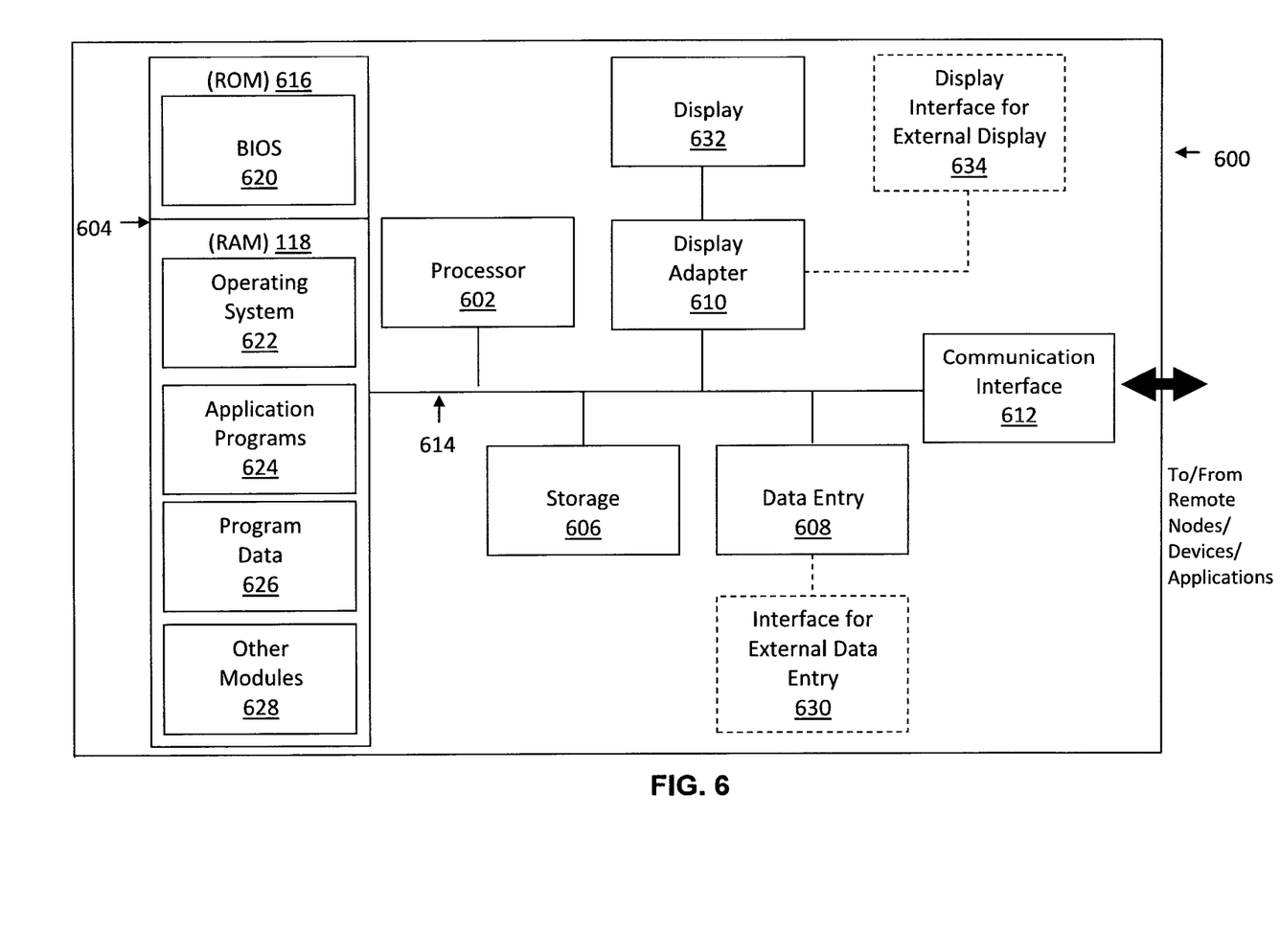
FIG. 6 depicts a diagram illustrating an exemplary computing system for execution of the operations comprising various embodiments of the disclosure.

FIG. 6 depicts a diagram illustrating an exemplary computing system 600 for execution of the operations comprising various embodiments of the disclosure. In some embodiments, the computing system 600 may represent the data analyzer 120, data computation 140 (and/or data source 145), and data computation 150 (and/or data source 155). As shown, the computing system 600 for implementing the subject matter disclosed herein includes a hardware device 600 including a processing unit 602, memory 604, storage 606, data entry module 608, display adapter 610, communication interface 612, and a bus 614 that couples elements 604—612 to the processing unit 602.

The bus 614 may comprise any type of bus architecture. Examples include a memory bus, a peripheral bus, a local bus, etc. The processing unit 602 is an instruction execution machine, apparatus, or device and may comprise a microprocessor, a digital signal processor, a graphics processing unit, an application specific integrated circuit (ASIC), a field programmable gate array (FPGA), etc. The processing unit 602 may be configured to execute program instructions stored in memory 604 and/or storage 606 and/or received via data entry module 608.

The memory 604 may include read only memory (ROM) 616 and random access memory (RAM) 618. Memory 604 may be configured to store program instructions and data during operation of device 600. In various embodiments, memory 604 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 604 may also include nonvolatile memory technologies such as nonvolatile flash RAM (NVRAM) or ROM. In some embodiments, it is contemplated that memory 604 may include a combination of technologies such as the foregoing, as well as other technologies not specifically mentioned. When the subject matter is implemented in a computer system, a basic input/output system (BIOS) 620, containing the basic routines that help to transfer information between elements within the computer system, such as during start-up, is stored in ROM 616.

The storage 606 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 600.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 606, ROM 616 or RAM 618, including an operating system 622, one or more applications programs 624, program data 626, and other program modules 628. A user may enter commands and information into the hardware device 600 through data entry module 608. Data entry module 608 may include mechanisms such as a keyboard, a touch screen, a pointing device, etc. Other external input devices (not shown) are connected to the hardware device 600 via external data entry interface 630. By way of example and not limitation, external input devices may include a microphone, joystick, game pad, satellite dish, scanner, or the like. In some embodiments, external input devices may include video or audio input devices such as a video camera, a still camera, etc. Data entry module 608 may be configured to receive input from one or more users of device 600 and to deliver such input to processing unit 602 and/or memory 604 via bus 614.

A display 632 is also connected to the bus 614 via display adapter 610. Display 632 may be configured to display output of device 600 to one or more users. In some embodiments, a given device such as a touch screen, for example, may function as both data entry module 608 and display 632. External display devices may also be connected to the bus 614 via external display interface 634. Other peripheral output devices, not shown, such as speakers and printers, may be connected to the hardware device 600.

The hardware device 600 may operate in a networked environment using logical connections to one or more remote nodes (not shown) via communication interface 612. The remote node may be another computer, a server, a router, a peer device or other common network node, and typically includes many or all of the elements described above relative to the hardware device 600. The communication interface 612 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 612 may include logic configured to support direct memory access (DMA) transfers between memory 604 and other devices.

In a networked environment, program modules depicted relative to the hardware device 600, or portions thereof, may be stored in a remote storage device, such as, for example, on a server. It will be appreciated that other hardware and/or software to establish a communications link between the hardware device 600 and other devices may be used.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

The illustrated and described method elements are not necessarily strictly independent or unitary method steps. One or more of the illustrated elements (steps) may be combined with one or more of the other elements. Likewise, one or more of the illustrated method elements may be separated into one or more constituent sub-elements or sub-steps. These steps and sub-steps may be performed by the same or different hardware components and software processes, such as those shown in FIG. 6. At least one component defined by the claims may be implemented at least partially as an electronic hardware component, such as an instruction execution machine (e.g., a processor-based or processor-containing machine) and/or as specialized circuits or circuitry (e.g., discrete logic gates interconnected to perform a specialized function). Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method to perform an analysis of a plurality of data sets stored at a plurality of data sources, the method comprising:

generating a graphical user interface that specifies a first remote data source and a plurality of operations that can be performed on a first data set and that specifies a second remote data source and another plurality of operations that can be performed on a second data set, wherein the first data source is of a first platform type and the second data source is of a second platform type, the first platform type being different than the second platform type;

generating a workflow that identifies the first remote data source and the second remote data source, an operation to combine, at the second data source running the second platform type, the first data set and the second data set that are stored at different data sources running different platform types, and at least one other operation;

receiving the workflow;

dynamically determining whether to translate the workflow;

in response to a determination to dynamically translate the workflow, translating the workflow into a set of instructions, wherein the translating is at least partially based on a platform type of the second data source at which the operation to combine is performed; and transmitting the first data set stored at the first remote data source and the set of instructions to the second remote data source at which the first data set and the second data set are combined after the first data set being transmitted to the second remote data source;

wherein the at least one other operation is a modeling algorithm operation, model validation operation, prediction operation, sampling operations, or any combination thereof.

2. The method of claim 1, wherein the first platform type is a relational database management system (RDBMS) and the second platform type is a distributed file system.

3. The method of claim 1, wherein the at least one other operation is an operation to be performed on the combined first data set and second data set by the second data source, the set of instructions for the second data source includes a step associated with the other operation.

4. The method of claim 1, wherein the set of instructions comprise at least one of programming code or function calls based on a type of platform associated with the first data source or second data source.

5. A system for analyzing a plurality of data sets stored at a plurality of data sources, the system comprising:

one or more processors; and a non-transitory computer-readable medium storing a processor-based application, which when executed on a computer, will cause the one or more processors to:

generate a graphical user interface that specifies a first remote data source and a plurality of operations that can be performed on a first data set and that specifies a second remote data source and another plurality of operations that can be performed on a second data set, wherein the first data source is of a first platform type and the second data source is of a second platform type, the first platform type being different than the second platform type;

generate a workflow that identifies the first remote data source and the second remote data source, an operation to combine, at the second data source running the second platform type, the first data set and the second data set that are stored at different data sources running different platform types, and at least one other operation;

receive the workflow;

dynamically determining whether to translate the workflow;

in response to a determination to translate the workflow, translating the workflow into a set of instructions, wherein the translating is at least partially based on a platform type of the second data source at which the operation to combine is performed; and transmit the first data set stored at the first remote data source and the set of instructions to the second remote data source at which the first data set and the second data set are combined after the first data set being transmitted to the second remote data source;

wherein the at least one other operation is a modeling algorithm operation, model validation operation, prediction operation, sampling operations, or any combination thereof.

6. The system of claim 5, wherein the first platform type is a relational database management system (RDBMS) and the second platform type is a distributed file system.

7. The system of claim 5, wherein the at least one other operation is an operation to be performed on the combined first data set and second data set by the second data source, the set of instructions for the second data source includes a step associated with the other operation.

8. The system of claim 5, wherein the set of instructions comprise at least one of programming code or function calls based on a type of platform associated with the first data source or second data source.

9. A computer program product, comprising a non-transitory computer readable medium carrying one or more sequences of instructions to analyze a plurality of data sets stored at a plurality of data sources which, when executed by one or more processors, causes the one or more processors to carry out the steps of:

generating a graphical user interface that specifies a first remote data source and a plurality of operations that can be performed on a first data set and that specifies a second remote data source and another plurality of operations that can be performed on the second data set, wherein the first data source is of a first platform type and the second data source is of a second platform type, the first platform type being different than the second platform type;

generating a workflow that identifies the first remote data source and the second remote data source, an operation to combine, at the second data source running the second platform type, the first data set and the second data set that are stored at different data sources running different platform types, and at least one other operation;

receiving the workflow;

dynamically determining whether to translate the workflow;

in response to a determination to dynamically translate the workflow, translating the workflow into a set of instructions, wherein the translating is at least partially based on a platform type of the second data source at which the operation to combine is performed; and transmitting the first data set stored at the first remote data source and the set of instructions to the second remote data source at which the first data set and the second data set are combined after the first data set being transmitted to the second remote data source;

wherein the at least one other operation is a modeling algorithm operation, model validation operation, prediction operation, sampling operations, or any combination thereof.

10. The computer program product of claim 9, wherein the first platform type is a relational database management system (RDBMS) and the second platform type is a distributed file system.

11. The computer program product of claim 9, wherein the at least one other operation is an operation to be performed on the combined first data set and second data set by the second data source, the set of instructions for the second data source includes a step associated with the other operation.

12. The computer program product of claim 9, wherein the set of instructions comprise at least one of programming code or function calls based on a type of platform associated with the first data source or second data source.

13. The method of claim 1, wherein the operation to combine is a join operation.

14. The system of claim 5, wherein the operation to combine is a join operation.

15. The computer program product of claim 9, wherein the operation to combine is a join operation.

16. The method of claim 1, wherein the at least one other operation further includes at least one selected from a group consisting of:

data extraction operations, exploration operations, transformation operations, and analysis operations to be performed on the combined first data set and second data set by the second data source, a second set of instructions for the second data source includes a step associated with the at least one other operation.

17. The system of claim 5, wherein the at least one other operation further includes at least one selected from a group consisting of:

data extraction operations, exploration operations, transformation operations, and analysis operations to be performed on the combined first data set and second data set by the second data source, a second set of instructions for the second data source includes a step associated with the at least one other operation.

18. The computer program product of claim 9, wherein the at least one other operation further includes at least one selected from a group consisting of:

data extraction operations, exploration operations, transformation operations, and analysis operations to be performed on the combined first data set and second data set by the second data source, a second set of instructions for the second data source includes a step associated with the at least one other operation.

19. The method of claim 1, further comprising:

generating the workflow that identifies the first remote data source and the second remote data source, the operation to combine the first data set and the second data set, and the at least one other operation, and, in addition thereto, at least one additional operation;

translating, by the computer, the workflow into another set of instructions specific to the first platform type and the at least one additional operation; and transmitting the other set of instructions to the first remote data source;

wherein the additional operation is at least one selected from a group consisting of: a data set combine operation, a data extraction operation, exploration operation, sampling operation, transformation operation, and analysis operation to be performed on the first data set of the first data source, the other set of instructions for the first data source includes a step associated with the additional operation.

20. The system of claim 5, wherein the non-transitory computer-readable medium storing the processor-based application, which when executed on a computer, will further cause the one or more processors to:
- generate the workflow that identifies the first remote data source and the second remote data source, the operation to combine on the first data set and the second data set, and the at least one other operation, and, in addition thereto, at least one additional operation;
- translate the workflow into another set of instructions specific to the first platform type and the at least one additional operation; and
- transmit the other set of instructions to the first remote data source;
- wherein the additional operation is at least one selected from a group consisting of: a data set combine operation, a data extraction operation, exploration operation, sampling operation, transformation operation, and analysis operation to be performed on the first data set of the first data source, the other set of instructions for the first data source includes a step associated with the additional operation.

21. The computer program product of claim 9, further comprising the steps of:
- generating the workflow that identifies the first remote data source and the second remote data source, the operation to combine the first data set and the second data set, and the at least one other operation, and, in addition thereto, at least one additional operation;
- translating, by the computer, the workflow into another set of instructions specific to the first platform type and the at least one additional operation; and
- transmitting the other set of instructions to the first remote data source;
- wherein the additional operation is at least one selected from a group consisting of: a data set combine operation, a data extraction operation, exploration operation, sampling operation, transformation operation, and analysis operation to be performed on the first data set of the first data source, the other set of instructions for the first data source includes a step associated with the additional operation.

22. The method of claim 1, further comprising retrieving the first data set from the first data source.

* * * * *